United States Patent [19]
Wylie

[11] Patent Number: 4,819,984
[45] Date of Patent: Apr. 11, 1989

[54] AUTOMOBILE DOORMAT

[76] Inventor: Bruce B. Wylie, 9500 Big Cone Pl., Charlotte, N.C. 28210

[21] Appl. No.: 112,420

[22] Filed: Oct. 26, 1987

[51] Int. Cl.⁴ .............................................. B60J 1/20
[52] U.S. Cl. .................................... 296/152; 15/112; 15/237
[58] Field of Search .................. 296/152, 1 F; 15/112, 15/237; 280/164 A

[56] References Cited

U.S. PATENT DOCUMENTS 2,818,594  1/1958  Dawkins ............................ 296/152
2,857,173  10/1958  Benandor ........................ 280/164 A
2,979,340  4/1961  Morrissey ....................... 280/164 A Primary Examiner—Robert R. Song
Attorney, Agent, or Firm—Clifton Ted Hunt

[57] ABSTRACT

An automobile doormat is provided for protecting and preserving the floormat and carpet provided with the car. The doormat includes a stationary bracket extending vertically along the front portion of the interior of a door and a cleaning element removably supported on the bracket. The cleaning element may be installed and removed without tools and may be cleaned and replaced when desired. The cleaning element may be made from carpet which complements the appearance of the carpet in the automobile.

9 Claims, 1 Drawing Sheet

AUTOMOBILE DOORMAT

FIELD OF THE INVENTION

This invention relates to a shoe cleaning device for attachment to an automobile door to protect and preserve conventional automobile floormats and carpets.

BACKGROUND OF THE INVENTION

Footscrapers and other devices for cleaning the bottoms of shoes have been patented for use on automobiles since at least as early as 1916 (see U.S. Pat. No. 1,196,453 issued Aug. 19, 1916 to Mattie R. Hatfield for SHOE CLEANING ATTACHMENT FOR AUTOMOBILES, & C.). The early shoe cleaning devices included metal scrapers and brushes mounted on the running boards of automobiles.

When the running boards disappeared, efforts began to provide a satisfactory shoe cleaner mounted on a door of an automobile. The following patents are representative of earlier attempts to provide a satisfactory shoe cleaner on an automobile door:

| U.S. Pat. No. | DATE | INVENTOR | TITLE |
| --- | --- | --- | --- |
| 2,677,553 | May 4, 1954 | Miller | VEHICLE DOOR OPERATED FOOT SCRAPER |
| 2,818,594 | January 7, 1958 | Dawkins | AUTOMOBILE FOOT SCRAPER |
| 2,857,173 | October 21, 1958 | Benander | VEHICLE-MOUNTED SHOE SCRAPER |
| 2,979,340 | April 11, 1961 | Morrisey | AUTOMOBILE SHOE SCRAPER AND BRUSH ASSEMBLY |
| 3,097,388 | July 16, 1963 | Gresko | SHOE SCRAPING DEVICE |
| 3,165,334 | January 12, 1965 | Barrett | SHOE SCRAPER FOR AUTOMOBILES AND THE LIKE |
| 3,659,303 | May 2, 1972 | Schroder | COMBINED DIRT SCRAPER AND BRUSH FOR SHOES |

Additionally, U.S. Pat. No. 2,843,870 to Perry and U.S. Pat. No. 3,387,315 to Stata have issued for shoe cleaners attached to the floorboards of automobiles It is apparent that the problem of soiling automobile carpets with mud and debris carried into an automobile on the feet of the driver and passengers has long been recognized. The problem is of increasing importance because of the increasing cost of stylish automobiles and the owner's inherent desire to keep them clean. Yet, to applicant's knowledge, none of the prior art shoe cleaners are currently in use or have been accepted by the purchasing public.

One disadvantage common to all of the prior art door-mounted shoe cleaners is that the cleaning element cannot be easily removed, cleaned, and replaced by the user of the automobile.

Another disadvantage of several of the prior art door-mounted shoe-cleaning devices, which is overcome by the present invention, is that initial installation is too difficult for the average car owner and they are not appropriate for an aftermarket for existing automobiles.

SUMMARY OF THE INVENTION

It is an object of the invention to provide an automobile doormat which is mounted for easy access on the inside of an automobile door.

It is a more specific object of the invention to provide a doormat of the type described which includes a shoe cleaning element, a stationary bracket, and means for attaching the bracket to extend vertically along the front portion of the inner surface of an automobile door to removably support the shoe cleaning element. The cleaning element is simply placed on and lifted off the bracket without the need for tools of any kind.

A still further object of the invention is to provide an automobile doormat of the type described wherein the bracket is easily installed by the owner of an automobile on one or all of its doors. Of course, automobiles may be equipped with the doormat of this invention at the time of manufacture, if desired.

It is another object of the invention to provide an automobile doormat of the type described wherein the cleaning element is a piece of carpet attached to the door. The carpet is preferably coordinated with or is the same as the carpet on the floor of the automobile.

Some of the objects of the invention having been stated, other objects will appear to those skilled in the art from a consideration of the following description of the illustrated embodiment of the invention.

DETAILED DESCRIPTION OF THE INVENTION

Figure 1:
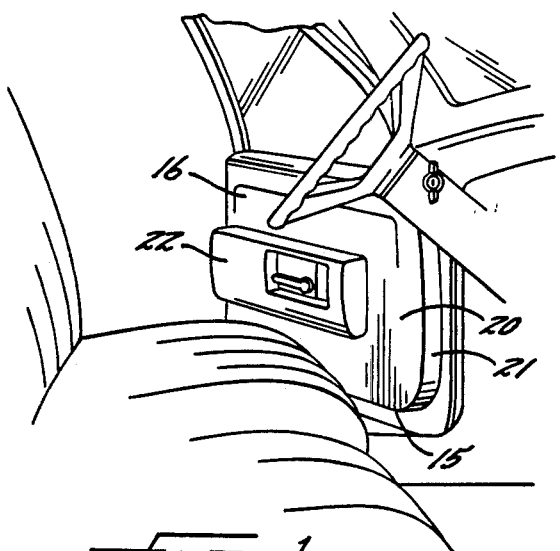
FIG. 1 is a perspective view looking from the inside of an automobile toward the inside of an opened door and illustrating the configuration of the front portion of the inner surface of the door before installation of the doormat of this invention.

Referring more specifically to the drawings, the numeral 10 broadly represents an automobile doormat comprising a bracket 11 and a shoe cleaning element 12.

The bracket 11 is of L-shaped configuration and includes a flange 13 and a plate 14 extending from each other in generally perpendicular relation. When operably installed, the flange 13 is fastened in a horizontal position to the bottom wall 15 of the interior of an automobile door 16 as by screws 17 with the plate 14 extending vertically along the front portion 20 of the inner surface of the door 16.

In the illustrated embodiment, the front portion 20 of the door 16, between its front edge 21 and an arm rest 22, is flat and the plate 14 is shown to be flat to conform with the flat front portion 20. It is recognized, however, that in some models of automobiles the surface corresponding to the front portion 20 in the illustrated embodiment is of a different configuration, such as curved or rounded. It is intended that the shape of the plate 14 be made to conform with the configuration of that portion of an automobile door corresponding to the front portion 20 in the illustrated embodiment.

Figure 4:
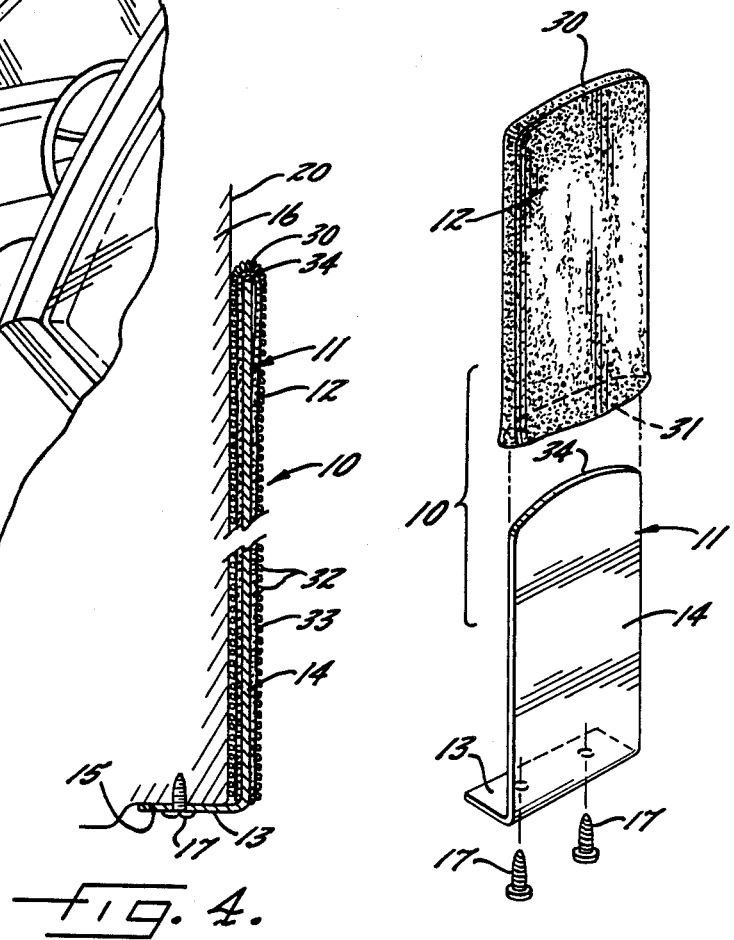
FIG. 4 is a sectional view taken substantially along the line 4—4 in FIG. 2.
Figure 5:
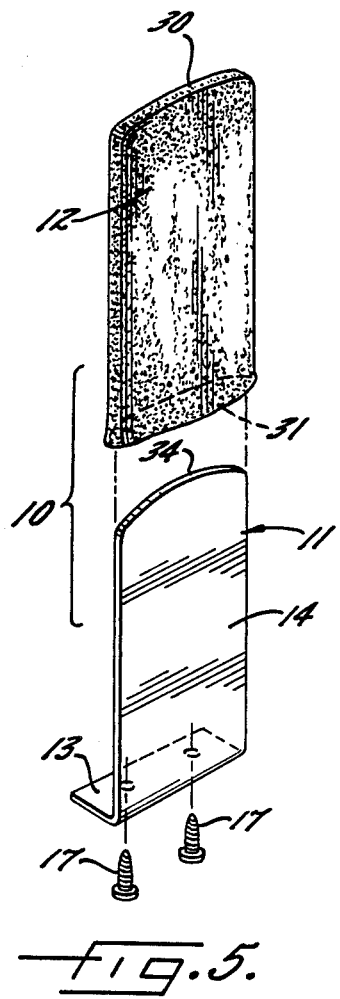
FIG. 5 is an exploded perspective view of the doormat and bracket of FIG. 4 removed from the automobile and illustrating the assembly of the doormat and the removal of the cleaning element from the bracket.

The shoe cleaning element 12 is a tubular sleeve of textured material, such as carpet, with a closed end 30 and an open end 31. Carpet material is shown as the cleaning element 12 in the illustrated embodiment and the carpet material is preferably cut pile with filaments 32 extending about one half an inch from a conventional carpet backing 33 (FIG. 4). Textured material of this nature provides the mass and texture desired for cleaning of mud and debris from the bottoms of shoes, and has the additional advantage of being selectable to complement the appearance of the floormat and carpet in the automobile.

Figure 2:
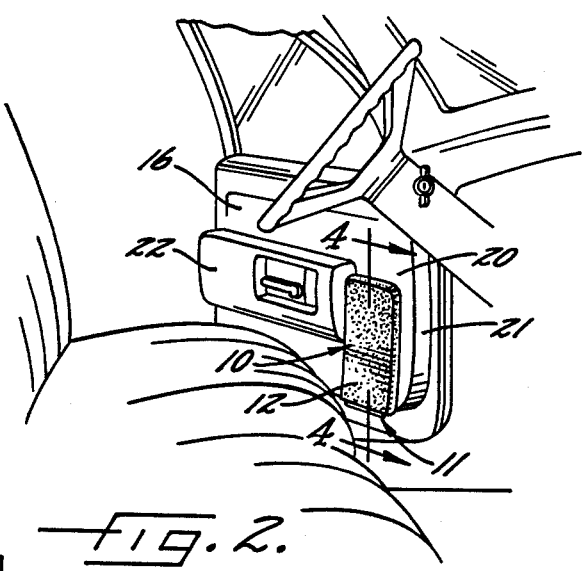
FIG. 2 is a perspective view of the front portion shown in FIG. 1 after installation of a doormat.
Figure 3:
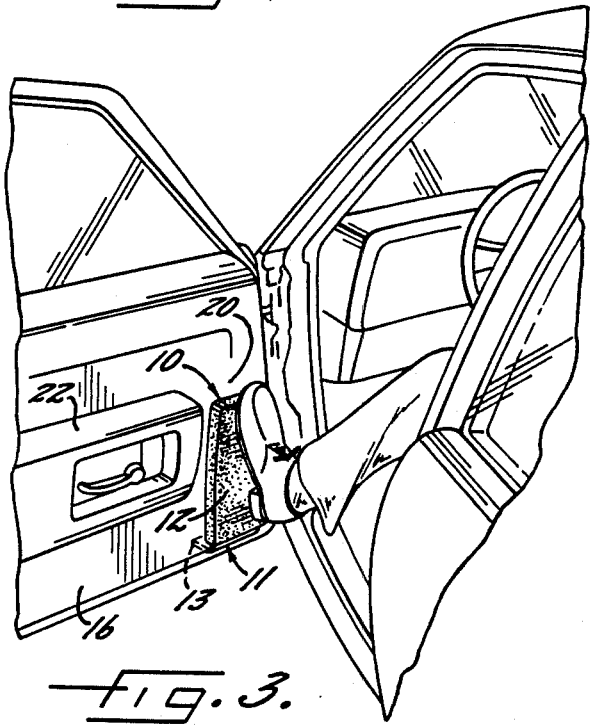
FIG. 3 is a perspective view of the door and doormat shown in FIG. 2 but looking from the outside of the automobile and illustrating use of the installed doormat.

The open end 31 of the cleaning element 12 fits over the upper edge 34 of the plate 14 on the bracket 11. The tubular cleaning element is the same length as the plate 14 and of only slightly larger diameter than the plate. The sleeve fits loosely on the plate and the upper edge 34 of the plate supports the closed end 30 of the sleeve or cleaning element 12 in the operative position of FIGS. 2 and 3.

The doormat 10 is installed in overlying relation to the front portion 20 of a door to be readily accessible after a person has backed into an automobile without touching the feet to the floor.

When the shoe cleaning element 12 becomes soiled after use, it may be easily removed from the bracket 11 and cleaned in a washing machine or otherwise as desired. The cleaned element 12 may be as easily reinstalled on the bracket for further use.

There is thus provided an automobile doormat which includes a stationary bracket, that is easily installed by the owner of an automobile, and a removable cleaning element which fits over the bracket and is easily removed for cleaning and replaced without tools when needed.

Although specific terms have been used in describing the invention they have been used in a generic and descriptive sense only and not for the purpose of limitation.

I claim:

1. An automobile doormat comprising a bracket, means for attaching the bracket in a near vertical plane and in inwardly spaced parallel relation to the inside of an automobile door, a cleaning element, and means for releasably supporting the cleaning element on the bracket with a portion of the cleaning element positioned for use in inwardly spaced parallel relation to the near vertical plane of the bracket.

2. An automobile doormat according to claim 1 wherein said bracket includes a plate extending in spaced parallel relation to the front portion of the inside surface of the door, and said plate including an upper edge spaced above the bottom of the door.

3. An automobile doormat according to claim 2 wherein said cleaning element comprises a tubular sleeve of textured material, and wherein said means for releasably supporting the cleaning element on the bracket comprises a closed end on the tubular sleeve engageable with the upper surface of the said plate when assembled in operative relation.

4. An automobile doormat according to claim 1 wherein said cleaning element is a piece of carpet.

5. An automobile doormat according to claim 3 wherein said cleaning element is a piece of carpet.

6. An automobile doormat according to claim 2 wherein said bracket includes a flange extending in parallel relation to the bottom wall of the interior of said door, and means for attaching the flange to the said bottom wall.

7. A doormat for an automobile door having an interior front edge and a bottom wall, said doormat comprising a bracket and a cleaning element, said bracket comprising a flange and a plate extending in generally perpendicular relation to each other, said plate having an upper edge and having a configuration conforming to the surface configuration of the front portion of the interior of the automobile door, means for attaching the flange of the bracket to the bottom wall of said door with the plate extending vertically in spaced parallel relation to the said front portion of the interior of the door and with the upper edge of the plate above the bottom wall of the door, a cleaning element, said cleaning element comprising textured fabric of tubular configuration, and the textured fabric including an open end to fit around the plate and a closed end to rest on the upper edge of the plate.

8. A doormat according to claim 7 wherein the cleaning element includes filaments about one-half an inch long.

9. A doormat according to claim 8 wherein the cleaning element is a piece of carpet.

* * * * *